May 17, 1938.   J. H. HOWARD ET AL   2,117,481
ROCK CORE DRILL HEAD
Filed Feb. 19, 1935
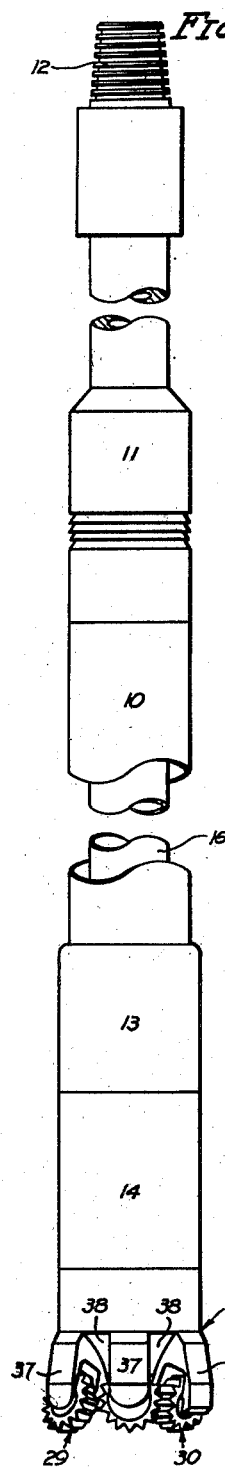
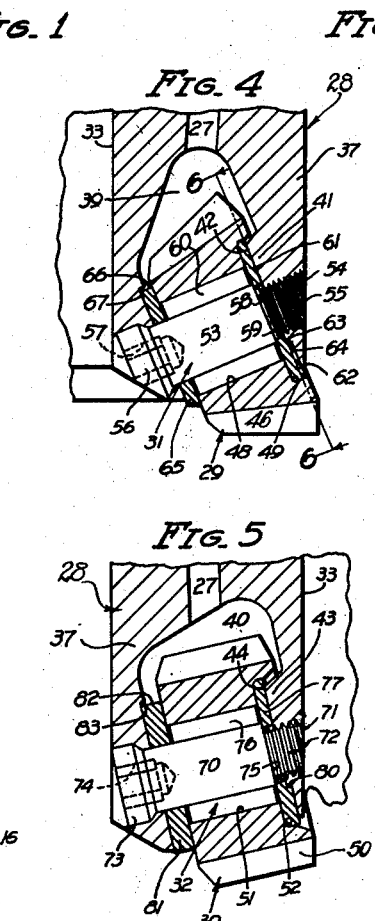
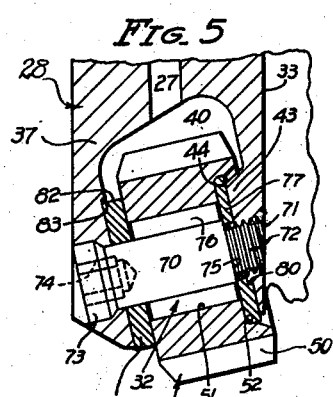
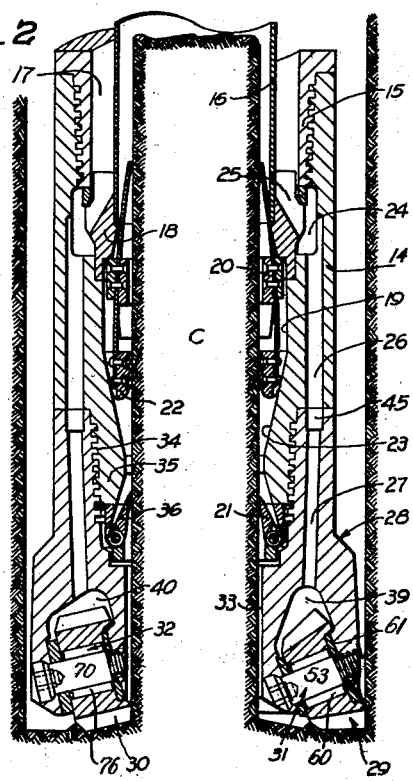
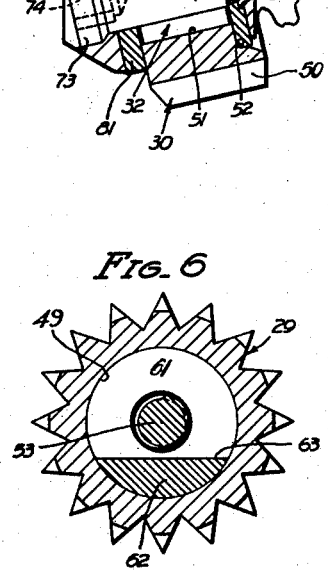
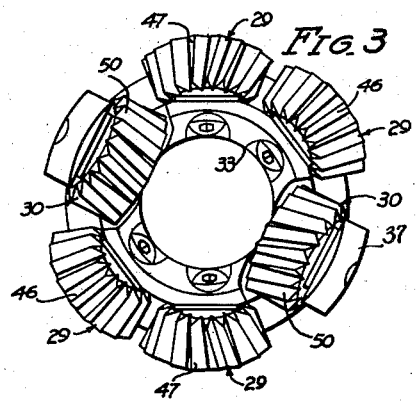
INVENTORS
JOHN H. HOWARD
ALFRED C. CATLAND
PER
ATTORNEY Patented May 17, 1938

2,117,481

UNITED STATES PATENT OFFICE 2,117,481

ROCK CORE DRILL HEAD

John H. Howard, Huntington Park, and Alfred C. Catland, Alhambra, Calif.; said Catland assignor to Globe Oil Tools Company, Los Nietos, Calif., a corporation of California Application February 19, 1935, Serial No. 7,209

9 Claims. (Cl. 255—72)

This invention relates to rotary well drilling tools and relates more particularly to a drill head for a rotary well core drill. A general object of this invention is to provide a practical, effective and simplified rock core drill head.

Another object of the invention is to provide a practical, dependable means for rotatably mounting the roller cutters of a rock core drill head that is particularly simple and inexpensive.

Another object of the invention is to provide a roller cutter assembly for a well drill that embodies a sturdy cutter carrying pin that is inexpensive of manufacture.

Another object of the invention is to provide a roller cutter mounting that does not necessitate a bushing on the pin whereby the roller bearing may be of large diameter without reducing the wall thickness of the cutter.

Another object of the invention is to provide a core drill head in which the cutters are rotatably supported in recesses in the lower end of the head by improved means that allows the wall of the head to be of minimum thickness whereby the drill is operable to recover a core of maximum diameter.

Another object of the invention is to provide a core drill head in which the means for rotatably mounting the cutters in the recesses tie together the wall portions at the opposite sides of the recesses to form a structure of maximum strength.

A further object of the invention is to provide a core drill head in which the cutters are dependably supported for rotation without welding any of the parts whereby the cutters and their mountings may be easily and quickly removed for replacement, etc.

Other objects and features of our invention will be fully understood from the following detailed description of a typical preferred form and application of the invention, throughout which description reference is made to the accompanying drawing, in which:

Fig. 1 is a side elevation of a core drill embodying the head of the present invention. Fig. 2 is an enlarged longitudinal detailed sectional view of the lower portion of the drill and the drill head. Fig. 3 is a bottom plan view of the drill head. Fig. 4 is an enlarged fragmentary detailed sectional view of a portion of the head illustrating one of the outer cutters and its mounting. Fig. 5 is a view similar to Fig. 4 illustrating one of the inner cutters and its mounting, and Fig. 6 is an enlarged detailed sectional view taken substantially as indicated by line 6—6 on Fig. 4.

The core drill head and the cutter mounting means of this invention may be embodied in core drills varying considerably in character. In the following detailed description, we will disclose the invention embodied in one type of core drill, it being understood that this disclosure is not to be taken as a restriction of the scope or application of the invention.

The core drill illustrated in the drawing includes an outer barrel 10 having a lifter sub 11 on its upper end. The sub 11 is provided with a threaded pin 12 for connecting the drill with a drill collar or other part of a drill string. A sub 13 is threaded on the lower end of the outer barrel 10 and a bit head sub 14 is screw threaded on its pin 15. The inner barrel 16 of the drill extends longitudinally through the outer barrel 10 with substantial clearance to leave an annular fluid passage 17. An enlargement or collar 18 on the lower end of the inner barrel 16 is rotatable in the opening 19 of the sub 14. As fully described and claimed in co-pending application, Serial No. 7,208, filed Feb. 19, 1935, now Patent No. 2,066,625, granted Jan. 5, 1937, the drill has a slip type core catcher 20 and a pivoted dog type core catcher 21. The slip type catcher 20 is shiftable and rotatable in the opening 19 and its slips 22 are adapted to be actuated by an inclined wall 23 of the opening 19 to grip the core C. The pivoted dog type catcher 21 is arranged in the cutter head or bit head as will be subsequently described. An annular recess 24 is provided in the upper portion of the sub 14 and ports 25 in the collar 18 establish communication between the passage 17 and the recess 24. Longitudinal ports 26 extend through the wall of the sub 14 to carry the circulation fluid from the recess 24 to the bit head.

The bit head or cutter head provided by the present invention includes, generally, a shoe or body 28, roller cutters 29 and 30, and means 31 and 32 rotatably mounting the cutters 29 and 30 in the body 28.

The body 28 of the cutter head is an annular or tubular member having a central longitudinal opening 33 provided at its upper end with a socket 34. The socket 34 is threaded to receive the pin 35 on the lower end of the sub 14. The lower end portion of the socket 34 is open to carry the core catcher 21. The core catcher 21 has pivoted dogs 36 operable to bite into the core C. The periphery of the body 28 may be cylindrical and flush with the periphery of the sub 14. Circumferentially spaced ribs or wings 37 are provided on the lower end portion of the body 28. The vertical spaces 38 between the ribs 37 form fluid channels for carrying the upwardly flowing fluid after it has discharged from the lower end of the drill.

Spaced recesses 39 are provided in the lower end of the body 28 to receive the cutters 29 and recesses 40 are formed in the lower end of the body to receive the cutters 30. The recesses 39 and 40 extend upwardly in the body 28 from its lower end and are located so that the wings 37 constitute their outer walls. In the particular arrangement shown there are two diametrically opposite recesses 40 and two pairs of adjacent recesses 39 spaced between the recesses 40. The inner and outer walls of the recesses 39 are preferably inclined downwardly and outwardly relative to the longitudinal axis of the drill and may be substantially parallel. Protuberances or bosses 41 are provided on the outer walls of the recesses 39. The inner sides or faces 42 of the bosses 41 are preferably flat and parallel with the side walls of the recesses 39. The recesses 39 are located so that their lower end portions are partially open at the outer sides of the wings 37. The inner and outer walls of the recesses 40 are preferably inclined downwardly and inwardly with respect to the longitudinal axis of the head and may be substantially parallel. Bosses 43 project from the inner walls of the recesses 40. The inner sides or faces 44 of the bosses 43 are flat and substantially parallel with the inclined side walls of the recesses 40. The lower end portions of the recesses 40 have partial communication with the lower end part of the opening 33. An annular groove 45 is provided in the upper end of the body 28 to communicate with the lower ends of the ports 26. Spaced longitudinal ports 27 extend downwardly through the body from the groove 45 to the recesses 39 and 40 to discharge the circulation fluid downwardly against the cutters 29 and 30.

The cutters 29 are the outer cutters of the head, being operable to form the outer portion of the annular bore and cut the bore to the required outside diameter. The outer cutters 29 are substantially frusto-conical roller cutters having flat normal opposite ends and inclined peripheries. The peripheries of the cutters 29 are provided with teeth or cutting parts. In accordance with the broader principles of the invention, any suitable form of cutting parts may be provided on the cutters 29. In the particular form of the invention illustrated, straight axial cutting teeth 46 are provided on one cutter 29 of each pair and spiralled cutting teeth 47 are provided on the other cutters 29. The spiralled teeth 47 of the cutter 29 at one side of the head are pitched in the opposite direction to the teeth 47 on the cutter on the other side of the head. Central longitudinal openings 48 extend through the cutters 29. In accordance with the invention, sockets 49 are provided in the outer ends of the cutters 29. The inner walls of the sockets 49 are flat and normal, while the outer portions of the sockets may be flared.

The cutters 30 are the inner cutters of the tool and are mounted and positioned to form the inner portion of the annular bore and trim the core C. The cutters 30 are substantially cylindrical and are provided with peripheral cutting teeth 50. The cutting teeth 50 are preferably spiralled and the teeth of one cutter 30 are pitched in the opposite direction to the teeth of the other cutter.

The inner roller cutters have central longitudinal openings 51. Enlargements or sockets 52 are provided at the inner ends of the cutter openings 51. The sockets 52 have flat normal inner walls and the outer portions of the sockets may be flared.

The means 31 for rotatably mounting or supporting the outer cutters 29 includes pins 53 extending transversely through the recesses 39. Openings 54 are provided in the body 28 to intersect the recesses 39 and carry the pins 53. The openings 54 extend through the wall of the body 28 from the outer sides of the wings 37 to the opening 33. The longitudinal axes of the pin carrying openings 54 are inclined downwardly and inwardly relative to the longitudinal axis of the drill. The pins 53 are entered in the openings 54 from their inner ends and the outer end portions 55 of the pins are screw threaded in the openings. Heads 56 are provided on the inner ends of the pins 53 and are received in suitable counter bores in the body. Polygonal sockets 57 are provided in the heads 56 to receive wrenches for turning or threading the pins 53. Portions of the heads 56 may be ground away to be flush with the bevelled mouth of the core receiving opening 33. The main body portions of the pins 53 are cylindrical and are preferably hardened. A reduced fillet 58 is provided on each pin between its threaded portion 55 and its major cutter carrying portion. The reduced fillets 58 provide annular outwardly facing shoulders 59 on the pins 53. The fillets 58 occur immediately inwardly of the faces 42 and the shoulders 59 are spaced from the faces. It is to be noted that the pins 53 are simple and inexpensive to manufacture because all of their parts with the exception of the sockets 57 may be readily turned.

In accordance with the invention, anti-friction roller bearings or rollers 60 are provided in the openings 48 of the cutters 29 to rotatably bear on the pins 53. The rollers 60 terminate at their outer ends at the shoulders 59 and the inner ends of the rollers may occur at or adjacent the inner ends of the cutters 29. It is a feature of the invention that non-rotatable thrust washers 61 are provided in the sockets 49 to bear against the faces 42 of the bosses 41. The washers 61 are proportioned to properly fit the sockets 49 and transmit the outward end thrusts from the cutters 29 to the bosses 41. The thrust washers 61 are preferably hardened to be long wearing. Each washer 61 has a lug or key 62 on its outer side and spaced below the pin 53. The keys 62 have flat or straight inner sides or shoulders 63. In the preferred form shown, the shoulders 63 are substantially tangential to circles concentric with the axes of the pins 53. The shoulders 63 of the washers 61 cooperate with mating or opposing flat shoulders 64 on the body 28. The cooperation of the shoulders 63 with the shoulders 64 positively holds the thrust washers 61 against rotation. The shoulders 59 of the pins 53 engage the washers 61 to hold them in positions where their shoulders 63 cooperate with the shoulders 64. The washers 61 with their keys 62 may be comparatively thin and do not necessitate thickening of the body wall or squaring or flattening of the pins 53. Thrust washers 65 are positioned between the inner ends of the cutters 29 and the inner walls of the recesses 39. The inner thrust washers 65 have flat upper edges 66 which cooperate with corresponding shoulders 67 on the inner walls of the recesses 39. The engagement of the edges 66 with the shoulders 67 holds the washers 65 against turning. The threads on the pins 53 are preferably right-hand threads so that turning of the pins or the tendency of the pins to turn, due to rotation of the cutters 29 during drilling, tightens the pins 53 in the openings 54. The outer ends of the pins 53 may be ground off or bevelled to be substantially flush with the outer surfaces of the wings 37. It is to be noted that the provision of the socket 49 allows the combined thickness of the cutter 29 and the washer 65 to be greater than the width of the recess 39. Due to this relationship of the parts the pin 53 has extensive threaded engagement with the body 28 without requiring that the body wall be thickened.

In assembling an outer cutter 29 and its mounting in a recess 39, the rollers 60 are arranged in the cutter openings 48 and the washers 61 are arranged in the sockets 49. The assembly of the cutter, the rollers 60 and the washer 61, is then inserted in the recess 39 and the parts are positioned so that the washer shoulder 63 bears against the body shoulder 64 and the wall of the recess 49 properly engages the washer 61. The thrust washer 65 is then inserted in place and the pin 53 is passed into the opening 54 and tightly threaded to its final position.

The means 32 for mounting or supporting the inner cutters 31 for rotation in the recesses 40 includes pins 70 extending transversely through the recesses. Transverse openings 71 are provided in the wall of the body 28 to intersect the recesses 40. The longitudinal axes of the openings 71 are inclined downwardly and outwardly and may be substantially normal to the inner and outer walls of the recesses 40. The cutter carrying pins 70 are introduced in the openings 71 from their outer ends and the inner end portions 72 of the pins are screw threaded in the openings. Heads 73 are provided on the outer ends of the pins 70 and are received in suitable counter bores in the body 28. Polygonal sockets 74 or other suitable means are provided in the heads 73 for engagement by wrenches for turning the pins 70. The main body portions of the pins 70 are cylindrical and are hardened. A reduced fillet is formed on each pin 70 between its body portion and its threaded inner portion 70 to provide an outwardly facing annular shoulder 75. The shoulders 75 are spaced some distance outwardly from the faces 44 of the bosses 43. Anti-friction bearings or rollers 76 are provided in the openings 71 of the cutters 30 to rotatably bear on the pins 70.

In accordance with the invention, non-rotatable thrust washers 77 are provided to bear against the faces 44 and to project into the sockets 52. The washers 77 are formed to properly fit the sockets 52 and to bear against the faces 44. The washers 77 have keys on their lower portions whose upper sides or edges form upwardly facing shoulders 80 similar to and corresponding to the shoulders 63 of the washers 61. These shoulders 80 cooperate with mating or opposing body shoulders to hold the washers 77 against rotation. The shoulders 75 on the pins 70 hold the washers 77 in positions where their shoulders 80 properly cooperate with the body shoulders. Thrust washers 81 are interposed between the outer ends of the cutters 30 and the outer walls of the recesses 40. The washers 81 have flat upper sides 82 which cooperate with the body shoulders 83 to hold the washers against turning. The cutters 30 and their mountings are assembled in substantially the same manner as the cutters 29 and their mountings. The screw threads of the pins 70 are preferably left hand threads so that any turning of the pins due to rotation of the cutters 30 tightens the pins 70.

The cutters 29 are mounted and positioned so that their lower end portions project downwardly beyond the lower end of the body 28 and project outwardly from the wings 37 to engage the earth formation. Because of the inclination of their axes of rotation the cutters engage the outer portion of the annular bore to form a substantially horizontal bottom surface. The inner cutters 30 project downwardly beyond the lower end of the body 28 and project inwardly to properly trim the core C. The cutters 29 and 30 are securely and dependably supported by the mounting means of the present invention. The mounting means does not necessitate bushings on the pins 70 so that the bearings 60 and 76 may be of maximum diameter without reducing the wall thickness of the cutters. The thrust washers 61, 65, 77 and 81 are effectively held against rotation and the construction is such that the provision of the thrust washers does not require thickening of the body wall. The pins 53 and 70 tie together the body walls at the opposite sides of the recesses 39 and 40 to strengthen the head. The pins 53 and 70 may be readily removed to permit the easy replacement or repair of the cutters and their mountings.

Having described only a typical preferred form of our invention, we do not wish to limit ourselves to the specific details set forth, but wish to reserve to ourselves any changes or variations that may appear to those skilled in the art or fall within the scope of the following claims.

Having described our invention, we claim:

1. In a well drill, a body having a recess and an opening intersecting the recess, a pin threaded in the opening at one side of the recess, a head on the pin engaging the body wall at the other side of the recess whereby the pin ties together the wall portions of the body at opposite sides of the recess, a shoulder on the pin opposing a wall of the recess, a bearing surface on said wall, a rotatable cutter on the pin, and a washer on the pin between an end of the cutter and said wall and having an end surface held in cooperation with the said bearing surface by the shoulder on the pin.

2. In a well drill, a body having a recess and an opening intersecting the recess, a pin extending through the opening and having a reduced portion threaded in the opening and providing the pin with a shoulder opposing a wall of the recess, a shoulder on said wall, a cutter in the recess rotatable on the pin, a washer on the pin between an end of the cutter and said wall clamped between said wall and the shoulder on the pin by inward threading of the pin, and a lug on the washer cooperating with the shoulder on the wall to hold the washer against rotation.

3. In a well drill, a body having a recess and an opening intersecting the recess, a boss on the wall of the recess, a pin arranged in the opening to extend through the recess, the pin comprising a reduced portion threaded in the opening at one side of the recess, and a head cooperating with the body at the other side of the recess whereby the pin ties together the portions of the body at the opposite sides of the recess, a cutter on the pin and having a socket in one end, a shoulder on the pin at the end of said reduced portion, a washer on the pin received in the socket and held against axial movement on the pin between the shoulder and the boss, and a lug on the washer cooperating with the body to hold the washer against rotation.

4. In a well drill, a body having a recess and an opening intersecting the recess, a boss on the wall of the recess, a pin threaded in the opening to extend through the recess, a cutter in the recess rotatable on the pin and having a socket in one end, a shoulder on the pin, a washer on the pin received in the socket and held against axial movement on the pin between the shoulder and the boss, a shoulder on the boss, and a shoulder on the washer cooperating with the shoulder on the boss to hold the washer against turning.

5. In a well drill, a body having a recess and an opening intersecting the recess, a pin arranged in the opening to extend through the recess, the pin including a reduced portion threaded in the opening at one side of the recess, and a head engaging the body at the other side of the recess whereby the pin ties together the parts of the body at the opposite sides of the recess, said reduced portion providing a shoulder on the pin opposing a wall of the recess, a shoulder on said wall, a cutter in the recess, rollers rotatably supporting the cutter on the pin, and a washer on the pin between an end of the cutter and said wall and having a flat surface clamped in cooperation with the shoulder on said wall by the shoulder on the pin.

6. In a well drill, a body having a recess and an opening intersecting the recess, a pin in the opening extending through the recess and having a reduced end portion threaded in the opening and providing the pin with a shoulder opposing a wall of the recess, a cutter in the recess rotatable on the pin, a thrust washer on the pin between an end of the cutter and said wall, a lug on the washer held in cooperation with the body by the engagement of the shoulder with the washer and operable to hold the washer against rotation, a thrust washer between the other wall of the recess and the other end of the cutter, and means holding the last mentioned washer against rotation.

7. In a well drill, a tubular body having a recess in its lower end, a boss on a wall of the recess, there being an opening in the body extending through the boss and intersecting the recess, a pin extending through the recess and having a reduced portion threaded into the opening where it passes through the boss and providing the pin with a shoulder spaced from and opposing the boss, a shoulder on the boss, a cutter rotatable on the pin and having a socket in one end, a washer received in the socket and adapted to bear on the boss, and a lug on the washer cooperating with the shoulder to prevent rotation of the washer, the shoulder on the pin cooperating with the washer through the inward threading of the pin to hold its lug in cooperation with the boss shoulder, the socket partially receiving the boss whereby the pin may have extensive threaded cooperation with the body without thickening the body wall.

8. A core drill comprising, a tubular body having a recess in its lower end, an inclined pin extending through the recess, a washer on the pin at the inner wall of the recess, and a roller cutter rotatable on the pin and operable to trim the core for reception in the lower end of the body, there being a socket in the inner end of the cutter receiving the washer whereby the cutter overhangs the washer and the adjacent body wall to prevent contact thereof with the core.

9. A core drill comprising, a tubular body having a recess in its lower end and a downwardly and outwardly inclined opening intersecting the recess, a pin passed inwardly through the opening and threaded in the inner part of the opening, a head on the outer end of the pin engaging the body whereby the pin ties together the body walls at opposite sides of the recess, a shoulder on the pin opposing the inner wall of the recess, a roller cutter rotatable on the pin, a washer on the pin clamped between the shoulder and said inner wall of the recess, and means holding the washer against rotation, the cutter having a socket in its inner end receiving the washer and the adjacent lower inner portion of the body wall whereby the cutter trims the core so that the core does not engage the washer or said wall portion.

JOHN H. HOWARD.
ALFRED C. CATLAND.